(12) United States Patent  
Kishimoto et al.

(10) Patent No.: US 7,336,171 B2
(45) Date of Patent: Feb. 26, 2008

(54) VEHICULAR ELECTRONIC KEY SYSTEM

(75) Inventors: Yasuaki Kishimoto, Tokyo (JP); Toshiaki Hata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 145 days.

(21) Appl. No.: 11/371,904

(22) Filed: Mar. 10, 2006

(65) Prior Publication Data
US 2007/0069871 A1   Mar. 29, 2007

(30) Foreign Application Priority Data
Sep. 29, 2005   (JP)   ............................. 2005-284041

(51) Int. Cl.
*G08B 1/08*   (2006.01)
(52) U.S. Cl. ................. 340/539.32; 340/989; 340/991; 340/426.13; 340/426.16; 340/426.17; 340/426.35
(58) Field of Classification Search ........... 340/539.32, 340/989, 991, 993, 426.13, 426.14, 426.16, 340/426.17, 426.35, 426.36
See application file for complete search history.

(56) References Cited

U.S. PATENT DOCUMENTS 6,600,994 B1 *   7/2003   Polidi .......................... 701/209
6,975,938 B2 *   12/2005   Odagawa et al. ........... 701/202
7,051,933 B1 *   5/2006   Nagaoka et al. ............ 235/451
7,213,766 B2 *   5/2007   Ryan et al. .................. 235/492
7,253,715 B2 *   8/2007   Bates ........................ 340/5.73

FOREIGN PATENT DOCUMENTS

JP   2004-114860 A   4/2004

* cited by examiner

*Primary Examiner*—Daryl C Pope
(74) *Attorney, Agent, or Firm*—Sughrue Mion, PLLC

(57) ABSTRACT

A vehicular electronic key system includes an on-board device that mutually communicates with a portable device, and operates control equipment installed on a vehicle when specific information from the portable device is authenticated. The on-board device includes a distance storage section for storing travel distances of the vehicle, and a warning section for warning that the portable device disappeared when communication was stopped between the on-board device and the portable device. The on-board device communicates with the portable device each time a predetermined distance is travelled, stores the travel distance at each communication time point into the distance storage section, and drives, upon detection that a signal transmitted from the portable device was disrupted, the warning section to warn an undetected region between the last travel distance stored immediately before the transmitted signal was disrupted and a travel distance at a time point at which the transmitted signal was disrupted.

11 Claims, 4 Drawing Sheets

VEHICULAR ELECTRONIC KEY SYSTEM

BACKGROUND OF THE INVENTION

1. Field of the Invention

The present invention relates to a vehicular electronic key system that is applied to controlling a vehicle such as a car, an automobile, etc., and more particularly, it relates to a new technique for an on-board device that detects the presence or absence of a portable device.

2. Description of the Related Art

In recent years, a variety of advanced techniques have been proposed for vehicular electronic key systems that control door locking, engine starting, etc., of a vehicle through an on-board device which is controlled by a portable device operated by a user of the vehicle.

Also, there has been proposed a technique that verifies the existence of a portable device through communication thereto from an on-board device during the time when a vehicle is standing still or travelling, and generates, in case of the absence of the portable device, an alarm or warning so as to inform a user of the loss or missing of the portable device thereby to prompt the user to look for it (see, for example, a first patent document (Japanese patent application laid-open No. 2004-114860)).

In the known vehicular electronic key system, a procedure of specifying the undetected state of a portable device is as follows:

(1) The portable device is detected at each fixed time (e.g., 10 seconds).

(2) A detection operation is executed at a fixed time period or interval from a first undetection of the portable device.

(3) The number of times or frequency of continuous or successive undetections of the portable device is counted so that when a predetermined frequency is reached, a warning is generated.

(4) If the vehicle is travelling after the generation of the warning, the user returns to a location where the portable device might be lost, and looks for the portable device.

In the known vehicular electronic key system, the undetected state of the portable device is merely warned, so the user can recognize that the portable device has become in the undetected state, but there has been a problem that in case where the vehicle is travelling, it is impossible to recognize in what time (hour) band or in what place (area) the undetected state of the portable device occurred, and to specifically know where the portable device was lost.

In addition, there has also been a problem that even when the vehicle is standing still or stopping, by merely generating an alarm or warning from the on-board device, it is impossible to recognize what time the communication with the portable device was disrupted or broken off.

Moreover, in case where the presence or absence of the portable device is detected during travel of the vehicle, the detection of the portable device is tried to be repeated at fixed time intervals after it has been determined for the first time that the portable device is in an undetected state, so that the start of warning is finally decided or fixed, an alarm or warning is generated. As a result, the time point of generation of such an alarm or warning becomes after the vehicle has moved away from the point (i.e., the first undetected point or location) where the undetected state of the portable device was generated for first time, so there arises a problem that the range in which the undetected point of the portable device is to be specified increases too much depending upon the detection time interval and the vehicle speed, thus resulting in difficulty for the user to specify the undetected point.

Further, in order to generate an alarm or warning in a place near the undetected point of the portable device thereby to reduce the undetected point specifying range, it can be considered that the detection period of the portable device is set shorter, but in this case, there arises a further problem that mutual communication between the on-board device and the portable device becomes more frequent, so the battery consumption of the portable device becomes more intense, thus impairing the original or intrinsic function of the vehicular electronic key system. As a result, such a scheme is not practical.

SUMMARY OF THE INVENTION

Accordingly, the present invention is intended to solve the problems as referred to above, and has for its object to obtain a vehicular electronic key system which is capable of specifying or identifying, upon warning an undetected state of a portable device, the loss or missing of the portable device while suppressing the frequency of repeated detections of the undetected state of the portable device to a minimum, and of making a warning by predicting a point or location (a distance range) or a time point (a period of time) in which the portable device became undetected, so as to enable a user to easily look for the lost or missed portable device.

Bearing the above object in mind, according to the present invention, there is provided a vehicular electronic key system including an on-board device installed on a vehicle, and a portable device that is possessed by a user of the vehicle. The on-board device serves to operate control equipment installed on the vehicle when authenticated specific information from the portable device by mutually communicating with the portable device. The on-board device includes a distance storage section that stores travel distances of the vehicle, and a warning section that warns that the portable device did no longer exist when communication was stopped between the on-board device and the portable device. The on-board device communicates with the portable device each time a predetermined distance has been travelled during travel of the vehicle, stores the travel distance of the vehicle at the time point of each communication with the portable device into the distance storage section, and drives, upon detection that a signal transmitted from the portable device was disrupted, the warning section to warn an undetected region between the last travel distance stored in the distance storage section immediately before the transmitted signal was disrupted and a travel distance at a time point at which the transmitted signal was disrupted.

According to the present invention, a warning can be issued at a location or a time point near the point where or when the portable device was lost or missed without increasing the detection frequency of the portable device unnecessarily, whereby it is possible for the user to look for the lost or missed portable device in an easy manner based on accurate and prompt warning information.

The above and other objects, features and advantages of the present invention will become more readily apparent to those skilled in the art from the following detailed description of a preferred embodiment of the present invention taken in conjunction With the accompanying drawings.

DESCRIPTION OF THE PREFERRED EMBODIMENT

Now, a preferred embodiment of the present invention will be described in detail while referring to the accompanying drawings.

Embodiment 1.

Figure 1:
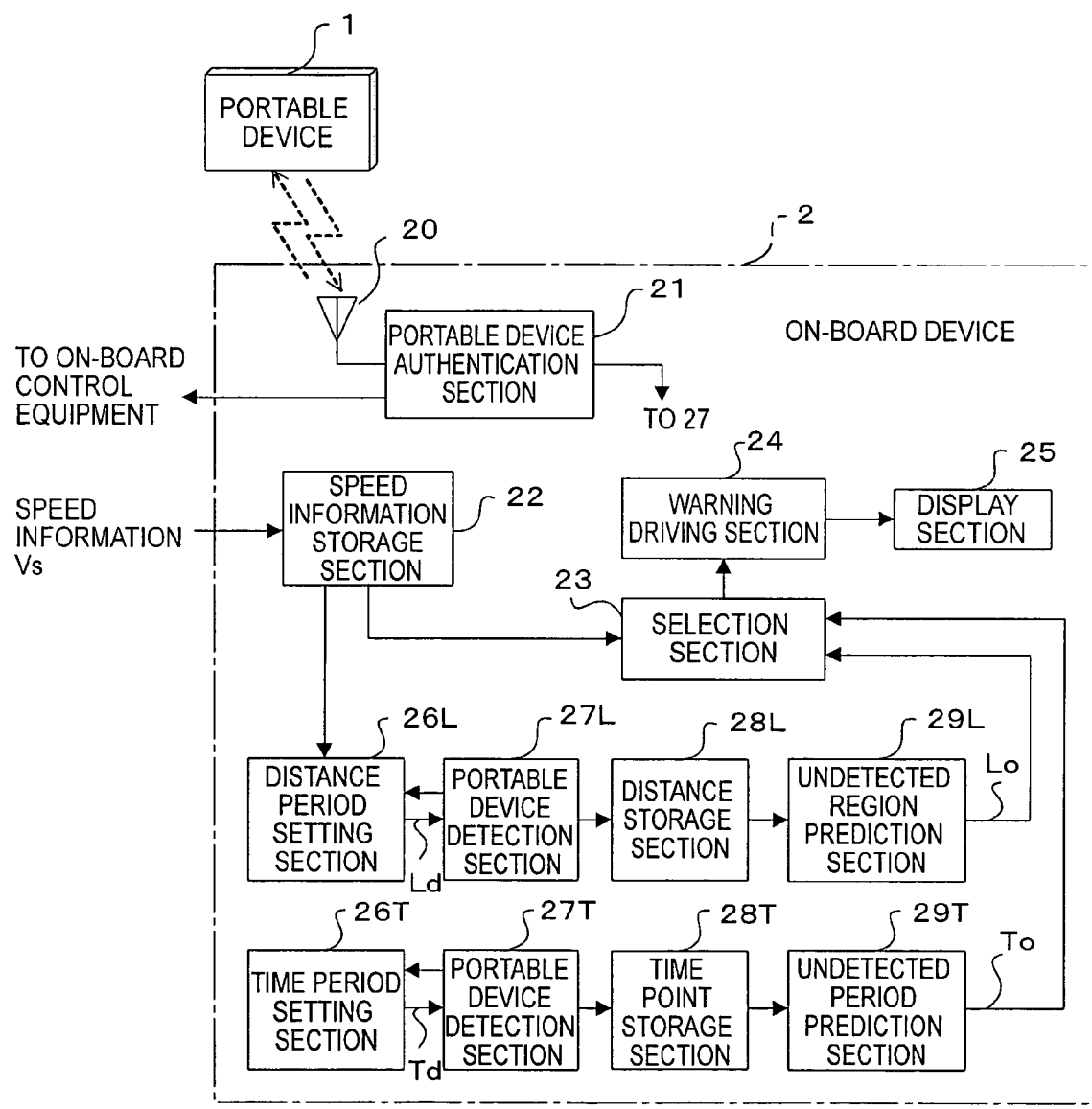
FIG. 1 is a block diagram showing the overall circuit configuration of a vehicular electronic key system according to a first embodiment of the present invention.

FIG. 1 is a block diagram that shows the overall circuit configuration of a vehicular electronic key system according to a first embodiment of the present invention. Here, reference will be made, as an example, to the case where the present invention is applied to a vehicle in the form of an automobile or motor vehicle, similarly as described above.

In FIG. 1, the vehicular electronic key system is provided with a portable device 1 that is possessed by a user of a vehicle (not shown) and an on-board device 2 installed on the vehicle.

The on-board device 2 includes an antenna 20 and a portable device authentication section 21, and serves to operate control equipment installed on the vehicle when specific or intrinsic information from the portable device 1 was authenticated in the portable device authentication section 21, by mutually communicating with the portable device 1 through the antenna 20.

Also, the on-board device 2 includes a speed information storage section 22 that stores speed information Vs from a vehicle speed sensor (not shown) or the like installed on the vehicle as the operating condition information of the vehicle.

In addition, the on-board device 2 includes a selection section 23 that selects a portable device detection section (to be described later) based on the speed information Vs, and a warning section that comprises a warning driving section 24 and a display section 25.

Further, the on-board device 2 includes a portable device detection section (26L through 29L) adapted to function each time the vehicle travels a predetermined distance, and a portable device detection section (26T through 29T) adapted to function each time a predetermined time elapses.

The portable device detection section, which is adapted to function in accordance with the travel distance of the vehicle, include a distance period setting section 26L, a portable device detection section 27L, a distance storage section 28L, and an undetected region prediction section 29L.

Similarly, the portable device detection section, which is adapted to function in accordance with the elapsed time, includes a time period setting section 26T, a portable device detection section 27T, a time point storage section 28T, and an undetected period prediction section 29T.

The distance period setting section 26L variably sets a predetermined distance, i.e., a distance period or cycle Ld, corresponding to a detection processing execution period or cycle of the portable device 1 in accordance with the detection result of the portable device detection section 27L.

The distance period Ld is set to an ordinary value L1 when the portable device 1 is detected, whereas it is set to a value L2 that is shorter or smaller than the ordinary value L1 when the portable device 1 is in an undetected state, as will be described later.

Though not illustrated here, the distance period setting section 26L includes a travel distance calculation section that calculates a travel distance L of the vehicle based on the speed information Vs, and each time the travel distance L reaches the distance period Ld, the distance period setting section 26L activates the portable device detection section 27L and at the same time stores an overall or total travel distance at each time point of each distance period Ld into the distance storage section 28L through the portable device detection section 27L.

The portable device detection section 27L determines, based on the authentication result of the portable device authentication section 21, whether a regular or qualified portable device 1 for the on-board device 2 has been detected (authenticated), and inputs the result of the detection indicating "OK" to the distance period setting section 26L when the portable device 1 has been detected.

On the other hand, when it is determined that the portable device 1 is in an undetected state, the portable device detection section 27L inputs the result of the detection indicating "undetection (communication from the portable device 1 was disrupted or broken off)" to the distance period setting section 26L, and the portable device detection section 27L stores into the distance storage section 28L the overall or total travel distance of the vehicle at the time point at which the undetected state was determined and the travel distance at the time of the last detection processing immediately before the undetected state is determined in such a manner that these travel distances can be distinguished from each other.

Each time it is determined that the portable device 1 is in an undetected state, the distance storage section 28L sequentially stores the travel distance at that time point, and when the number or frequency of determinations of the undetected state reaches a predetermined number of times a in succession, the distance storage section 28L inputs to the undetected region prediction section 29L the travel distance at the time point at which the undetected state was first determined and the travel distance immediately before the undetected state was determined.

The undetected region prediction section 29L predicts an undetected region Lo corresponding to the lost point of the portable device 1 from the travel distances stored in the distance storage section 28L, and inputs it to the selection section 23.

On the other hand, the time period setting section 26T variably sets a predetermined period of time, i.e., a time period Td, corresponding to the detection processing execution period of the portable device 1 in accordance with the detection result of the portable device detection section 27L.

The time period Td is set to an ordinary value T1 when the portable device 1 is detected, whereas it is set to a value T2 that is shorter or smaller than the ordinary value T1 when the portable device 1 is in an undetected state, as will be described later.

Though not illustrated here, the on-board device 2 includes a clock section that generates a clock signal, and the time period setting section 26T includes a detection time calculation section that calculates a detected time T based on the clock signal.

As a result, the time period setting section 26T activates the portable device detection section 27T each time the detection time T reaches the time period Td, and at the same time stores a time point corresponding to an overall or total elapsed time at each time period Td into the time point storage section 28T through the portable device detection section 27T.

The portable device detection section 27T determines, based on the authentication result of the portable device authentication section 21, whether a regular or qualified portable device 1 for the on-board device 2 has been detected (authenticated), and inputs the result of the detection indicating "OK" to the time period setting section 26T when the portable device 1 has been detected.

On the other hand, when it is determined that the portable device 1 is in an undetected state, the portable device detection section 27T inputs the result of the detection indicating "undetection (communication from the portable device 1 was disrupted or broken off)" to the time period setting section 26T, and the portable device detection section 27T stores in the time point storage section 28T the current time point at which the undetected state has been determined and the last time point immediately before the undetected state is determined in such a manner that these time points can be distinguished from each other.

Each time it is determined that the portable device 1 is in an undetected state, the time point storage section 28T sequentially stores that time point, and when the number or frequency of determinations of the undetected state reaches a predetermined number of times a in succession, the time point storage section 28T inputs to the undetected period prediction section 29T the time point at which the undetected state was first determined and the last time point immediately before the undetected state was determined.

The undetected period prediction section 29T predicts an undetected period of time (hereinafter referred to as an "undetected period") To corresponding to the lost point of the portable device 1 from the time points stored in the time point storage section 28T, and inputs it to the selection section 23.

The selection section 23 activates the portable device detection section including the undetected region prediction section 29L or the portable device detection section including the undetected period prediction section 29T based on the speed information Vs, and inputs the undetected region Lo or the undetected period To to the warning driving section 24.

That is, when the speed information Vs indicates that the vehicle is travelling, the selection section 23 selects the undetected region Lo and inputs it to the warning driving section 24.

On the other hand, when the speed information Vs indicates that the vehicle is standing still (Vs=0), the selection section 23 selects the undetected period To and inputs it to the warning driving section 24.

When communication is disrupted or stopped between the on-board device 2 and the portable device 1, the warning driving section 24 drives the display section 25 based on the undetected region Lo or the undetected period To, thereby warningly informing that the portable device 1 has disappeared or no longer existed.

That is, when the vehicle is travelling and the undetected region Lo is selected, the display section 25 warns that the portable device 1 disappeared in the undetected region Lo between the last travel distance immediately before the portable device 1 is lost and the travel distance at the time point at which the portable device 1 was lost.

That is, when the vehicle is travelling and the undetected period To is selected, the display section 25 warns that the portable device 1 disappeared in the undetected period To between the last time point immediately before the portable device 1 is lost and the time point at which the portable device 1 was lost.

In addition, the detection processing execution period of the portable device 1 is variably set in accordance with the last detection result, as previously stated.

That is, when it is detected that the transmitted signal from the portable device 1 was disrupted or stopped, the distance period setting section 26L sets the distance period Ld to the value L2 that is shorter than the ordinary value L1, so that the portable device detection section 27L repeatedly checks or verifies the undetected state of the transmitted signal, and the undetected region prediction section 29L finally decides the start of warning of the display section 25 (warning section) to output the undetected region Lo when the number of repetitions of the undetected state reaches the predetermined number of times α.

Thereafter, the distance period setting section 26L restores the distance period Ld to the ordinary value L1 after the warning information has been made.

Similarly, when it is detected that the transmitted signal from the portable device 1 was disrupted or stopped, the time period setting section 26T sets the time period Td to the value T2 that is shorter than the ordinary value T1, so that the portable device detection section 27T repeatedly checks or verifies the undetected state of the transmitted signal, and the undetected period prediction section 29T finally decides the start of warning of the display section 25 (warning section) to output the undetected period To when the number of repetitions of the undetected state reaches the predetermined number of times α.

Thereafter, the time period setting section 26T restores the time period Td to the ordinary value T1 after the warning information has been made.

Here, note that the on-board device 2 and the portable device 1 repeatedly perform mutual communication with each other over a period of time from the activation to the termination of the system.

In addition, the distance period Ld may be variably set in accordance with the change of the speed information Vs of the vehicle, for example, in such a manner that it becomes shorter at the time of high speed travelling than at the time of low speed travelling.

Further, the time point storage section 28T may store the travel distance of the vehicle at the time point at which the transmitted signal was disrupted together with the time point at which it was detected that the transmitted signal from the portable device 1 was disrupted, and the undetected period prediction section 29T may warn not only the undetected period To but also distance information corresponding to the undetected period To.

Now, reference will be made to a specific processing operation according to the first embodiment of the present invention as illustrated in FIG. 1 while referring to flow charts of FIGS. 2 and 3 together with timing charts of FIGS. 4 and 5.

First of all, reference will be made to the processing of detecting the portable device 1 based on the speed information Vs under travelling (the vehicle speed) and the processing of predicting the undetected region Lo while referring to FIGS. 2 and 4.

Figure 2:
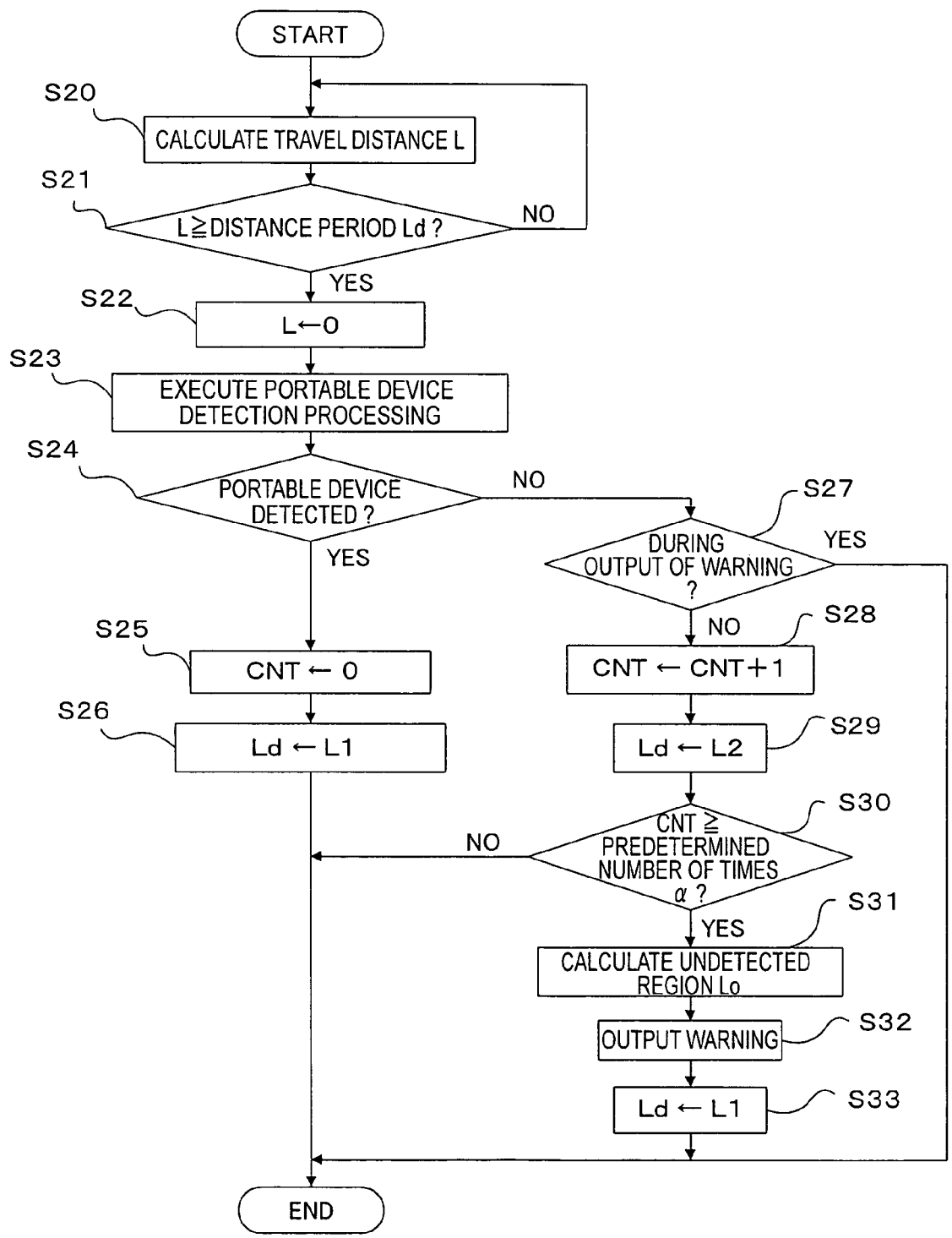
FIG. 2 is a flow chart illustrating portable device detection processing and undetected region prediction processing based on a distance period according to the first embodiment of the present invention.
Figure 4:
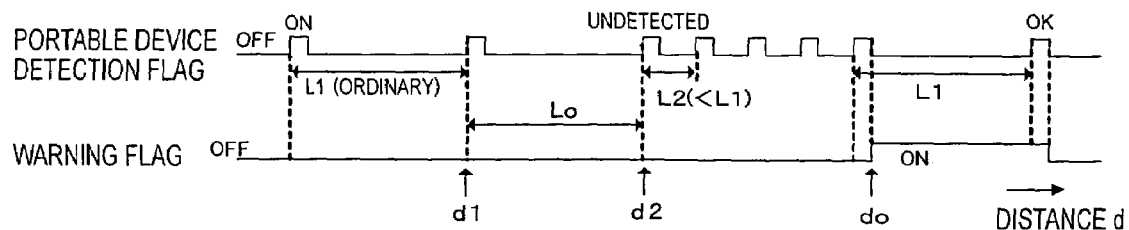
FIG. 4 is a timing chart illustrating the undetected region prediction processing based on the distance period according to the first embodiment of the present invention.

FIG. 2 illustrates an operation program for the portable device detection section 27L and the undetected region prediction section 29L, and FIG. 4 shows the change of a distance period Ld (L1, L2) according to the detection result of the portable device 1.

In FIG. 4, the axis of abscissa represents distances d corresponding to the distance period Ld, the undetected region Lo, the travel distance L of the vehicle and so on.

In FIG. 4, there are shown the ON/OFF timings of a portable device detection flag indicating the processing execution state of detecting the portable device 1 and a warning flag indicating the finally decided or fixed state of the start of warning.

The warning flag is turned on at a distance (point) do at which the start of warning is finally decided or fixed after the undetected state of the portable device 1 has been repeated 5 times.

A region from a position (distance) d1 at which the portable device 1 was able to be detected at the last time to a position d2 at which the undetected state of the portable device 1 was first determined is stored or calculated as the undetected region Lo.

In FIG. 2, it is assumed that the counter value CNT which counts the number of determinations of the undetected state of the portable device 1 is initially set to zero (cleared to 0) beforehand, and that the predetermined number of times α, which becomes a comparison criterion for comparison with the counter value CNT, is set to 5 [times] (i.e., α=5) (see FIG. 4) for example.

First of all, when a system power supply is turned on, the portable device authentication section 21 in the on-board device 2 activates or starts the control equipment, i.e., an engine of the vehicle in response to a signal transmitted from the regular or qualified portable device 1.

In addition, the on-board device 2 starts the processing of detecting the portable device 1 (FIG. 2), in which the travel distance L of the vehicle is calculated based on the speed information Vs stored in the speed information storage section 22 and the time elapsed from the start of travel (step S20).

Subsequently, it is determined whether the travel distance L has reached a predetermined distance period Ld (step S21), and when it is determined as L<Ld (that is, NO), the travel distance L has not yet reached the distance period Ld. Accordingly, a return is performed to step S20 where the calculation of the travel distance L is continuously repeated.

On the other hand, when it is determined as L≧Ld in step S21 (that is, YES), the travel distance L is cleared to zero (step S22), and the processing of detecting the portable device 1 is executed by the portable device detection section 27L (step S23).

Subsequently, it is determined whether the portable device 1 was detected (step S24). When it is determined that the portable device 1 was detected (that is, YES), the counter value CNT (the undetection frequency) is reset (cleared to 0) (step S25), and the following distance period Ld is set to the ordinary value L1 (long or large value) (step S26), and the processing routine of FIG. 2 is terminated, while returning to the START again.

On the other hand, when it is determined in step S24 that the portable device 1 was not detected (that is, NO), it is subsequently determined whether an alarm or warning is being output (i.e., during warning) (step S27). When it is determined that an alarm or warning is being output (that is, YES), the processing routine of FIG. 2 is terminated at once, and a return to the START is carried out again.

On the other hand, when it is determined in step S27 that an alarm or warning is not being output (that is, NO), the counter value CNT is incremented (step S28), and the distance period Ld is set to the value L2 that is shorter than the ordinary value L1 over the distance d (period) until the start of warning is finally decided or fixed (step S29), whereby it is determined whether the counter value CNT (the undetection frequency) reached the predetermined number of times a (step S30).

When it is determined as CNT<α in step S30 (that is, NO), the processing routine of FIG. 2 is terminated at once, and a return to the START is carried out again.

On the other hand, when it is determined as CNT≧α in step S30 (that is, YES), the undetected state of the portable device 1, being in the absence of the portable device 1, was finally decided after the undetected state of the portable device 1 has been determined the predetermined number of times a (=5 [times]), so the warning flag is turned on.

As a result, the undetected region prediction section 29L calculates the undetected region Lo (see FIG. 4) by referring to the distance storage section 28L (step S31).

At this time, the undetected region prediction section 29L may calculate the distance travelled from the first undetection based on the counter value CNT (the undetection frequency) and the distance period Ld, and calculate, as the undetected region Lo, a distance from the position d1 at which the portable device 1 was able to be detected to the position d2 at which the undetected state of the portable device 1 was first determined while going back from the distance do at the time point of the start of warning.

Then, in response to the step S31, the warning driving section 24 prepares information to be passed to the display section 25, and the display section 25 outputs an alarm or warning (step S32).

At this time, the distance period Ld is set short in step S29 when the undetected state of the portable device 1 is first determined. Therefore, the period of time until the final decision of the start of warning (i.e., until the counter value CNT reaches 5 (CNT=5)) can be shortened so that it is possible to facilitate the user to look for the portable device 1 in a region as near the first undetected position d2 as possible.

After executing an alarm or warning output (step S32), the distance period setting section 26L restores the distance period Ld used for the following processing of detecting the portable device 1 (step S21) to the ordinary value L1 (long or large value) (step S33), and the processing routine of FIG. 2 is terminated, while returning to the START again.

Next, reference will be made to the processing of detecting the portable device 1 based on the predetermined time period Td and the processing of predicting the undetected period To while referring to FIGS. 3 and 5.

Figure 3:
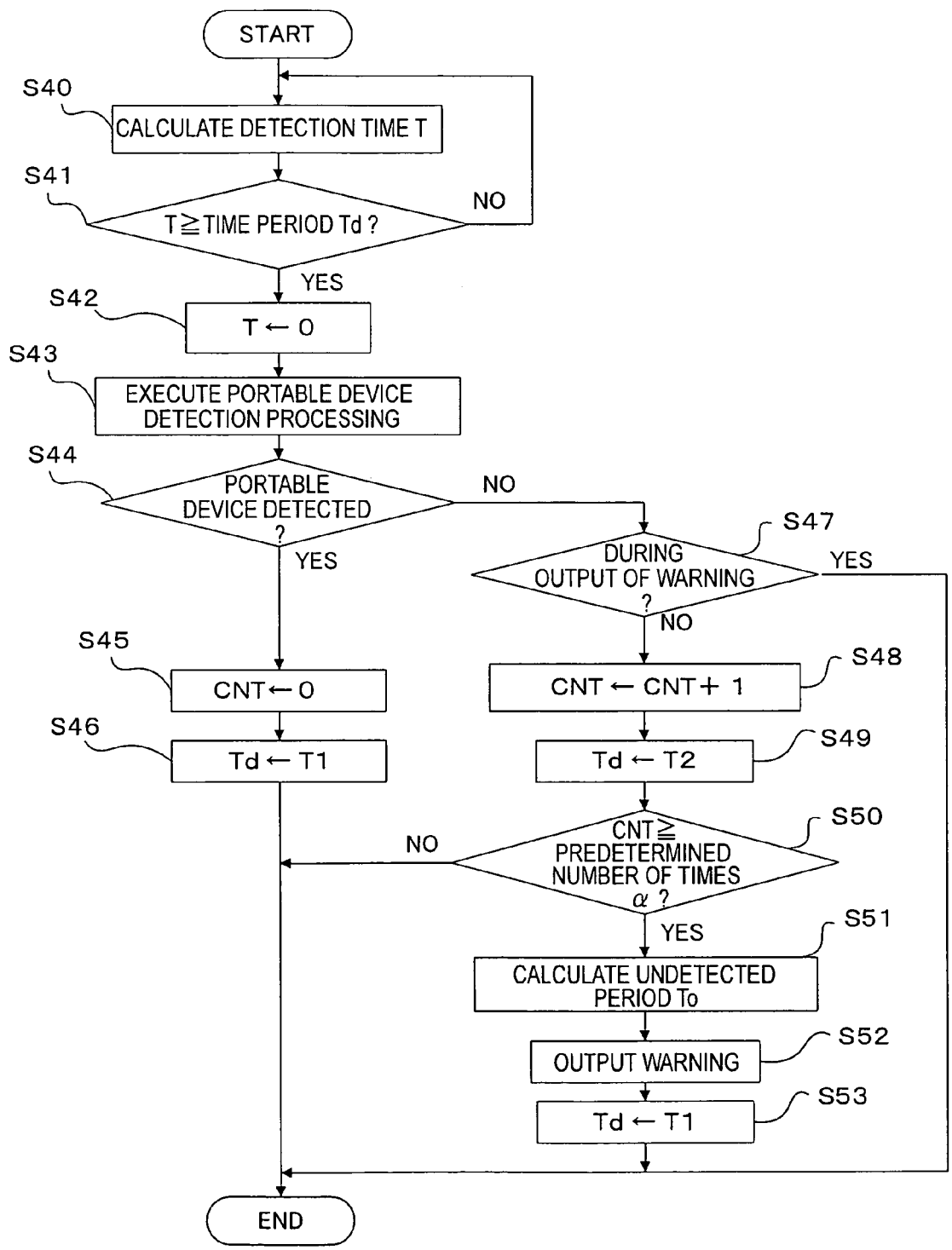
FIG. 3 is a flow chart illustrating portable device detection processing and undetected time prediction processing based on a time period according to the first embodiment of the present invention.
Figure 5:
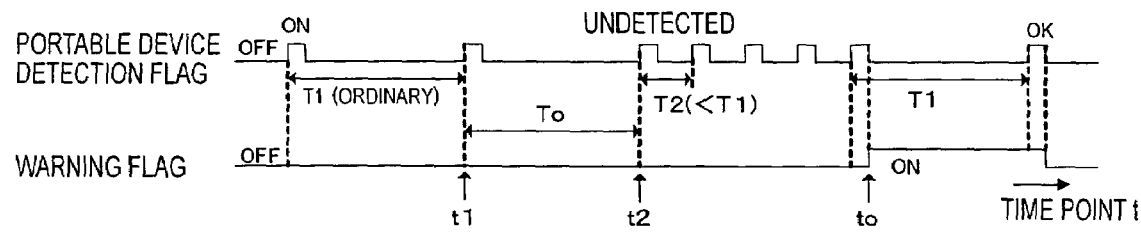
FIG. 5 is a timing chart illustrating the undetected time prediction processing based on the time period according to the first embodiment of the present invention.

FIG. 3 illustrates an operation program for the portable device detection section 27T and the undetected period prediction section 29T, in which steps S40 through S53 correspond to the steps S20 through S33, respectively, of the above-mentioned program (see FIG. 2), and FIG. 5 shows the change of a time period Td (T1, T2) according to the detection result of the portable device 1.

In FIG. 5, the axis of abscissa represents time points t corresponding to the time period Td, the undetected period To, the detected time T and so on.

In FIG. 5, similar to FIG. 4, there are shown the ON/OFF timings of a portable device detection flag indicating the processing execution state of detecting the portable device 1 and a warning flag indicating the finally decided or fixed state of the start of warning.

The warning flag is turned on at a time point to at which the start of warning is finally decided or fixed after the undetected state of the portable device 1 has been repeated 5 times.

A period of time from a time point t1 at which the portable device 1 was able to be detected at the last time to a time point t2 at which the undetected state of the portable device 1 was first determined is stored or calculated as the undetected period To.

In FIG. 3, it is assumed that the counter value CNT which counts the number of determinations of the undetected state of the portable device 1 is initially set to zero (cleared to 0) beforehand, and that the predetermined number of times $\alpha$ is set to 5 (i.e., $\alpha$=5) (see FIG. 5).

First of all, similarly as described above, when the system power supply is turned on, the portable device authentication section 21 in the on-board device 2 activates or starts the engine of the vehicle in response to a signal transmitted from the regular or qualified portable device 1, and the on-board device 2 starts the processing of detecting the portable device 1 (FIG. 3), and calculates an elapsed time as the detected time T (step S40).

Subsequently, it is determined whether the detected time T has reached a predetermined time period Td (step S41), and when it is determined as T<Td (that is, NO), the detected time T has not yet reached the predetermined time period Td. Accordingly, a return is performed to step S40 where the calculation of the detected time T is continuously repeated.

On the other hand, when it is determined as T$\geq$Td in step S41 (that is, YES), the detected time T is cleared to zero (step S42), and the processing of detecting the portable device 1 is executed by the portable device detection section 27T (step S43).

Subsequently, it is determined whether the portable device 1 was detected (step S44). When it is determined that the portable device 1 was detected (that is, YES), the counter value CNT (the undetection frequency) is reset (cleared to 0) (step S45), and the following time period Td is set to the ordinary value T1 (long or large value) (step S46), and the processing routine of FIG. 3 is terminated, while returning to the START again.

On the other hand, when it is determined in step S44 that the portable device 1 was not detected (that is, NO), it is subsequently determined whether an alarm or warning is being output (i.e., during warning) (step S47). When it is determined that an alarm or warning is being output (that is, YES), the processing routine of FIG. 3 is terminated at once, and a return to the START is carried out again.

On the other hand, when it is determined in step S47 that an alarm or warning is not being output (that is, NO), the counter value CNT is incremented (step S48), and the time period Td is set to the value T2 that is shorter or smaller than the ordinary value T1 over a period of time until the start of warning is finally decided or fixed (step S49), whereby it is determined whether the counter value CNT (the undetection frequency) reached the predetermined number of times $\alpha$ (step S50).

At this time, though not illustrated, the speed information Vs may be read in, and the speed information Vs or the position information (the travel distance L) at an undetected time point t2 may be stored.

When it is determined as CNT<$\alpha$ in step S50 (that is, NO), the processing routine of FIG. 3 is terminated at once, and a return to the START is carried out again.

On the other hand, when it is determined as CNT$\geq$$\alpha$ in step S50 (that is, YES), the undetected state of the portable device 1, being in the absence of the portable device 1, was finally decided after the undetected state of the portable device 1 has been determined the predetermined number of times $\alpha$ (=5 [times]), so the warning flag is turned on.

As a result, the undetected period prediction section 29T calculates the undetected period To (see FIG. 5) by referring to the time point storage section 28T (step S51).

At this time, the undetected period prediction section 29T may calculate the time elapsed from the first undetection based on the counter value CNT (the undetection frequency) and the time period Td, and calculate, as the undetected period To, a period of time from the time point t1 at which the portable device 1 was able to be detected to the time point t2 at which the undetected state of the portable device 1 was first determined while going back from the time point to of the start of warning.

Further, the distance travelled from the first undetected time point t2 may be calculated based on the individual pieces of speed information Vs that were stored at the time of 5 undetections, respectively. That is, the undetected point or location can be calculated from the time period Td and the speed information Vs.

Then, in response to the step S51, the warning driving section 24 prepares information to be passed to the display section 25, and the display section 25 outputs an alarm or warning (step S52).

At this time, the time period Td is set short in step S49 when the undetected state of the portable device 1 is first determined. As a result, the period of time until the final decision of the start of warning (i.e., until the counter value CNT reaches 5 (CNT=5)) can be shortened so that it is possible to facilitate the user to look for the portable device 1 within a period of time as near the first undetected time point t2 as possible.

Here, note that in step S52, not only the undetected period To but also the travel distance of the vehicle from the first undetected time point t2 may be warningly displayed.

After executing an alarm or warning output (step S52), the time period setting section 26T restores the time period Td used for the following processing of detecting the portable device 1 (step S41) to the ordinary value T1 (long or large value) (step S53), and the processing routine of FIG. 3 is terminated, while returning to the START again.

As described above, the on-board device 2 mutually communicates with the portable device 1 through a radio wave, and makes a determination as to whether the portable device 1 exists near the on-board device 2, in a periodical manner by receiving the radio wave from the portable device.

The on-board device 2 executes the processing of detecting the portable device 1 and the processing of predicting the undetected region Lo based on the vehicle speed and the travel distance L (see FIGS. 2 and 4) by using the result of determination of the presence or absence of the portable device 1 and the speed information Vs. That is, the on-board device 2 determines whether the portable device 1 was lost at the prescribed distance period or interval Ld, and predicts the undetected region Lo corresponding to the point at which the portable device 1 was lost.

In addition, the on-board device 2 executes the processing of predicting the undetected period To corresponding to a time point at which the portable device 1 was lost, based on the result of determination of the presence or absence of the portable device 1, the detected time T, and the speed information Vs (see FIGS. 3 and 5). That is, the on-board device 2 predicts the undetected period To corresponding to the time point at which the portable device 1 was lost at the prescribed time period Td.

The above-mentioned two types of detection and prediction sections for the presence and absence of the portable device 1 can be appropriately selected as required by the selection section 23.

Moreover, when it is determined that the portable device 1 was lost, the on-board device 2 can predict the lost point thereof as stated above, and warningly inform and designate it to the user by making the predicted point displayed with the display section 25 as in a range of the undetected region Lo (e.g., in a rearward range from ◯◯ m to ◯◯ m).

As described above, according to the present invention, a warning is generated at a position or time near the point at which the portable device 1 was lost without unnecessarily increasing the detection frequency of the portable device 1, whereby it is possible for the user to look for the lost portable device 1 in a quick and easy manner.

In addition, it is possible to accurately predict the location (range) or the time point at which the portable device 1 was lost, based on the speed information Vs.

Moreover, in consideration of a plurality of repeated determinations (redundancy), when a first undetected state of the portable device 1 is determined, the following detection period is set shorter, as a result of which an alarm or warning can be issued to the user in a range as near as possible to the location or time at which communication between the on-board device 2 and the portable device 1 was disrupted or broken off, thereby making it easy for the user to find the portable device 1.

Further, only when the portable device 1 is undetected, the detection period is set to the shorter or smaller value L2 or T2, and after an alarm or warning has been driven, the detection period is restored to the ordinary value L1 or T1 (longer or larger value), so that the number or frequency of communications can be suppressed. As a result, the battery consumption of the portable device 1 can be reduced.

Although the detection processing of the portable device 1 and the undetected region prediction processing based on the distance period Ld (the first portable device detection section), and the detection processing of the portable device 1 and the undetected period prediction processing based on the time period Td (the second portable device detection section) are selectively activated by the selection section 23 in accordance with the speed information Vs, both of the first and second portable device detection sections may instead be activated so as to display a plurality of pieces of prediction information.

Also, only either one of the first and second portable device detection sections may be used.

Additionally, although the display section 25 is used as the warning section in the event of the loss of the portable device 1, a voice alarm section may be used, or a display section and a voice section may be used in combination.

Further, although in the above-mentioned first embodiment, the electronic key system applied to the general motor vehicle has been described, it is needless to say that the present invention can be applied to other vehicles such as, for example, ocean vessels, aircrafts, etc., while providing operational effects equivalent to those as stated above.

While the invention has been described in terms of a preferred embodiment, those skilled in the art will recognize that the invention can be practiced with modifications within the spirit and scope of the appended claims.

What is claimed is:

1. A vehicular electronic key system comprising:
an on-board device installed on a vehicle; and
a portable device that is possessed by a user of said vehicle;
wherein said on-board device serves to operate control equipment installed on said vehicle when authenticated specific information from said portable device by mutually communicating with said portable device;
said on-board device includes:
a distance storage section that stores travel distances of said vehicle; and
a warning section that warns that said portable device did no longer exist when communication was stopped between said on-board device and said portable device;
wherein said on-board device communicates with said portable device each time a predetermined distance has been travelled during travel of said vehicle, stores the travel distance of said vehicle at the time point of each communication with said portable device into said distance storage section, and drives, upon detection that a signal transmitted from said portable device was disrupted, said warning section to warn an undetected region between the last travel distance stored in said distance storage section immediately before said transmitted signal was disrupted and a travel distance at a time point at which said transmitted signal was disrupted.

2. The vehicular electronic keyword system as set forth in claim 1, wherein when it is detected that the signal transmitted from said portable device was disrupted, said on-board device sets said predetermined distance to a value that is shorter than an ordinary value, repeatedly verifies an undetected state of said transmitted signal, and finally decides the start of warning by said warning section when the number of repetitions of said undetected state reaches a predetermined number of times.

3. The vehicular electronic key system as set forth in claim 2, wherein said predetermined distance is restored to the ordinary value after warning of said warning section.

4. The vehicular electronic key system as set forth in claim 1, wherein said on-board device and said portable device repeatedly perform mutual communication with each other over a period of time from the activation to the termination of the system.

5. A vehicular electronic key system comprising:
an on-board device installed on a vehicle; and
a portable device that is possessed by a user of said vehicle;
wherein said on-board device serves to operate control equipment installed on said vehicle when authenticated specific information from said portable device by mutually communicating with said portable device;
said on-board device includes:
a time point storage section that stores time points corresponding to elapsed times, respectively; and
a warning section that warns that said portable device did no longer exist when communication was stopped between said on-board device and said portable device;
wherein said on-board device communicates with said portable device each time a predetermined time has elapsed during standing still of said vehicle, stores the time point of each communication with said portable device into said time point storage section, and drives, upon detection that a signal transmitted from said portable device was disrupted, said warning section to warn an undetected period between the last time point stored in said time point storage section immediately before said transmitted signal was disrupted and a time point at which said transmitted signal was disrupted.

6. The vehicular electronic key system as set forth in claim 5, wherein when it is detected that the signal transmitted from said portable device was disrupted, said on-board device sets said predetermined time to a value that is shorter than an ordinary value, repeatedly verifies an undetected state of said transmitted signal, and finally decides the start of warning by said warning section when the number of repetitions of said undetected state reaches a predetermined number of times.

7. The vehicular electronic key system as set forth in claim 6, wherein said predetermined time is restored to the ordinary value after warning of said warning section.

8. The vehicular electronic key system as set forth in claim 5, wherein said on-board device and said portable device repeatedly perform mutual communication with each other over a period of time from the activation to the termination of the system.

9. A vehicular electronic key system comprising:
an on-board device installed on a vehicle; and
a portable device that is possessed by a user of said vehicle;
wherein said on-board device serves to operate control equipment installed on said vehicle when authenticated specific information from said portable device by mutually communicating with said portable device;
said on-board device includes:
a distance storage section that stores travel distances of said vehicle;
a time point storage section that stores time points corresponding to elapsed times, respectively;
a first portable device detection section related to said distance storage section;
a second portable device detection section related to said time point storage section;
a selection section that selectively activates said first or second portable device detection section based on speed information of said vehicle; and
a warning section that warns that said portable device did no longer exist when communication was stopped between said on-board device and said portable device as a result of detection of said first or second portable device detection section;
wherein said first portable device detection section communicates with said portable device each time a predetermined distance has been travelled during travel of said vehicle, stores the travel distance of said vehicle at the time point of each communication with said portable device into said distance storage section, and drives, upon detection that a signal transmitted from said portable device was disrupted, said warning section to warn an undetected region between the last travel distance stored in said distance storage section immediately before said transmitted signal was disrupted and a travel distance at a time point at which said transmitted signal was disrupted;

said second portable device detection section communicates with said portable device each time a predetermined time has elapsed during standing still of said vehicle, stores the time point of each communication with said portable device into said time point storage section, and drives, upon detection that the transmitted signal from said portable device was disrupted, said warning section to warn an undetected period between the last time point stored in said time point storage section immediately before said transmitted signal was disrupted and a time point at which said transmitted signal was disrupted.

10. The vehicular electronic key system as set forth in claim 9, wherein said selection section activates said first portable device detection section when said speed information indicates that said vehicle is traveling, and activates said second portable device detection section when said speed information indicates that said vehicle is standing still.

11. The vehicular electronic key system as set forth in claim 9, wherein said second portable device detection section warns the time point at which it was detected that the transmitted signal from said portable device was disrupted, together with the travel distance of said vehicle at the time point at which said transmitted signal was disrupted.

* * * * *